(12) United States Patent
van Rijkom et al.

(10) Patent No.: US 9,973,554 B2
(45) Date of Patent: May 15, 2018

(54) INTERACTIVE BROADCASTING BETWEEN DEVICES

(75) Inventors: Edwin Alexander Johannes van Rijkom, Zeist (NL); Yohko Aurora Fukada Kelley, Woodinville, WA (US)

(73) Assignee: Adobe Systems Incorporated, San Jose, CA (US)

(*) Notice: Subject to any disclaimer, the term of this patent is extended or adjusted under 35 U.S.C. 154(b) by 412 days.

(21) Appl. No.: 13/538,975

(22) Filed: Jun. 29, 2012

(65) Prior Publication Data
US 2014/0006500 A1    Jan. 2, 2014

(51) Int. Cl.
| | |
|---|---|
| *G06F 3/048* | (2013.01) |
| *G06F 3/01* | (2006.01) |
| *H04L 29/06* | (2006.01) |
| *G06F 15/16* | (2006.01) |
| *G06F 3/00* | (2006.01) |
| *H04L 12/18* | (2006.01) |
| *H04N 21/437* | (2011.01) |
| *H04N 21/472* | (2011.01) |
| *H04L 29/08* | (2006.01) |

(52) U.S. Cl.
CPC ...... *H04L 65/4046* (2013.01); *H04L 12/1895* (2013.01); *H04L 65/1083* (2013.01); *H04L 67/26* (2013.01); *H04N 21/437* (2013.01); *H04N 21/47205* (2013.01)

(58) Field of Classification Search
CPC ........... G06F 15/16; G06F 3/01; G06F 17/212
USPC ....................................................... 709/204
See application file for complete search history.

(56) References Cited

U.S. PATENT DOCUMENTS

| | | | | |
|---|---|---|---|---|
| 5,694,544 | A  * | 12/1997 | Tanigawa et al. ............. | 715/753 |
| 2006/0010392 | A1* | 1/2006 | Noel ...................... | G06F 3/0481 |
| | | | | 715/759 |
| 2006/0031779 | A1* | 2/2006 | Theurer ................ | G06F 3/1454 |
| | | | | 715/781 |
| 2006/0053196 | A1* | 3/2006 | Spataro ................. | H04L 65/403 |
| | | | | 709/205 |
| 2006/0075348 | A1* | 4/2006 | Xu ......................... | G06F 3/0481 |
| | | | | 715/730 |
| 2007/0198744 | A1* | 8/2007 | Wensley et al. .............. | 709/248 |
| 2007/0255788 | A1* | 11/2007 | Troung ................... | G06Q 10/10 |
| | | | | 709/205 |
| 2007/0260689 | A1* | 11/2007 | Chalmers ............... | G06Q 10/10 |
| | | | | 709/205 |

(Continued)

*Primary Examiner* — Kevin Bates
*Assistant Examiner* — Mark A Scott
(74) *Attorney, Agent, or Firm* — Shook, Hardy & Bacon, L.L.P.

(57) ABSTRACT

Methods and systems for providing and utilizing interactive broadcasting are provided. First content of a first file and state information associated with a first state of the first content are sent from a presenter device to one or more viewing devices. The presenter device receives a notification from a first viewing device of the one or more viewing devices indicating additional content to add to the first content in the first state. The presenter device generates second state information associated with a second state of the first content using the notification, the second state relating to the additional content. The second state information is sent from the presenter device to the one or more viewing devices to display the first content in the second state on the one or more viewing devices. The first content in the second state is displayed on the presenter device.

22 Claims, 12 Drawing Sheets

(56) References Cited

U.S. PATENT DOCUMENTS

| | | | |
|---|---|---|---|
| 2008/0263010 A1* | 10/2008 | Roychoudhuri et al. | 707/3 |
| 2009/0013045 A1* | 1/2009 | Maes | G06Q 10/10 709/205 |
| 2009/0099919 A1* | 4/2009 | Schultheiss et al. | 705/14 |
| 2009/0144391 A1* | 6/2009 | Jung et al. | 709/217 |
| 2009/0222741 A1* | 9/2009 | Shaw | G06Q 10/109 715/753 |
| 2010/0023849 A1* | 1/2010 | Hakim | H04L 12/6418 715/202 |
| 2010/0153887 A1* | 6/2010 | Yamaguchi et al. | 715/854 |
| 2010/0174773 A1* | 7/2010 | Penner et al. | 709/203 |
| 2010/0223320 A1* | 9/2010 | Huang et al. | 709/203 |
| 2010/0257456 A1* | 10/2010 | Lieb | G06Q 10/10 715/741 |
| 2011/0125847 A1* | 5/2011 | Cocheu et al. | 709/204 |
| 2011/0185036 A1* | 7/2011 | Lanier et al. | 709/217 |
| 2011/0231518 A1* | 9/2011 | Srinivasan | G06F 17/30056 709/219 |
| 2012/0007794 A1* | 1/2012 | Bansal | G06F 3/1454 345/2.1 |
| 2012/0023407 A1* | 1/2012 | Taylor | G06F 9/4443 715/731 |
| 2012/0166952 A1* | 6/2012 | Alexandrov et al. | 715/730 |
| 2012/0278388 A1* | 11/2012 | Kleinbart et al. | 709/204 |
| 2012/0284605 A1* | 11/2012 | Sitrick et al. | 715/230 |
| 2012/0284646 A1* | 11/2012 | Sitrick | G06Q 10/10 715/753 |
| 2012/0297305 A1* | 11/2012 | Hehmeyer | H04L 51/043 715/733 |
| 2012/0323990 A1* | 12/2012 | Hayworth | H04L 67/1095 709/203 |
| 2013/0031208 A1* | 1/2013 | Linton et al. | 709/217 |
| 2013/0073965 A1* | 3/2013 | Sik | G06F 17/241 715/730 |
| 2013/0091205 A1* | 4/2013 | Kotler et al. | 709/204 |
| 2013/0106888 A1* | 5/2013 | Penner | G06F 3/0484 345/582 |
| 2013/0110937 A1* | 5/2013 | Burns | G06Q 10/103 709/205 |
| 2013/0159414 A1* | 6/2013 | Zhou | H04L 65/4084 709/204 |
| 2013/0262686 A1* | 10/2013 | Hill | H04L 65/1069 709/228 |
| 2013/0290863 A1* | 10/2013 | Chen | G06F 3/0481 715/747 |
| 2013/0290872 A1* | 10/2013 | Hong et al. | 715/753 |
| 2013/0297696 A1* | 11/2013 | Alexandrov et al. | 709/204 |
| 2013/0305167 A1* | 11/2013 | Bastide | H04L 65/1069 715/753 |
| 2013/0339723 A1* | 12/2013 | Hix | H04L 63/0428 713/150 |
| 2013/0346868 A1* | 12/2013 | Scherpa | G06F 3/01 715/730 |
| 2014/0006491 A1* | 1/2014 | Hammer et al. | 709/204 |
| 2017/0118258 A1* | 4/2017 | Lieb | H04L 65/403 |

* cited by examiner

INTERACTIVE BROADCASTING BETWEEN DEVICES

TECHNICAL FIELD

This disclosure relates generally to the technical fields of software and/or hardware technology and, in one example embodiment, to systems and methods for interactive broadcasting between devices.

BACKGROUND

The use of computing devices to conduct meetings with multiple attendees has become a helpful way to display information relating to the topic of a meeting. For example, a meeting organizer may prepare a presentation on a computing device, and an attendee may be able to view the presentation on the attendee's own viewing device if the attendee is remote from the location of the presentation or if the attendee would like to have a better view of the presentation on the attendee's own device.

Although the utilization of computing devices to conduct meetings may be helpful in distributing presentation information, the use of computing devices for this purpose is typically limited. For example, a presenter may share a presentation that the presenter is viewing on the presenter's device with attendees of the meeting. However, an attendee of the meeting is merely able to view the presentation being controlled by the presenter.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
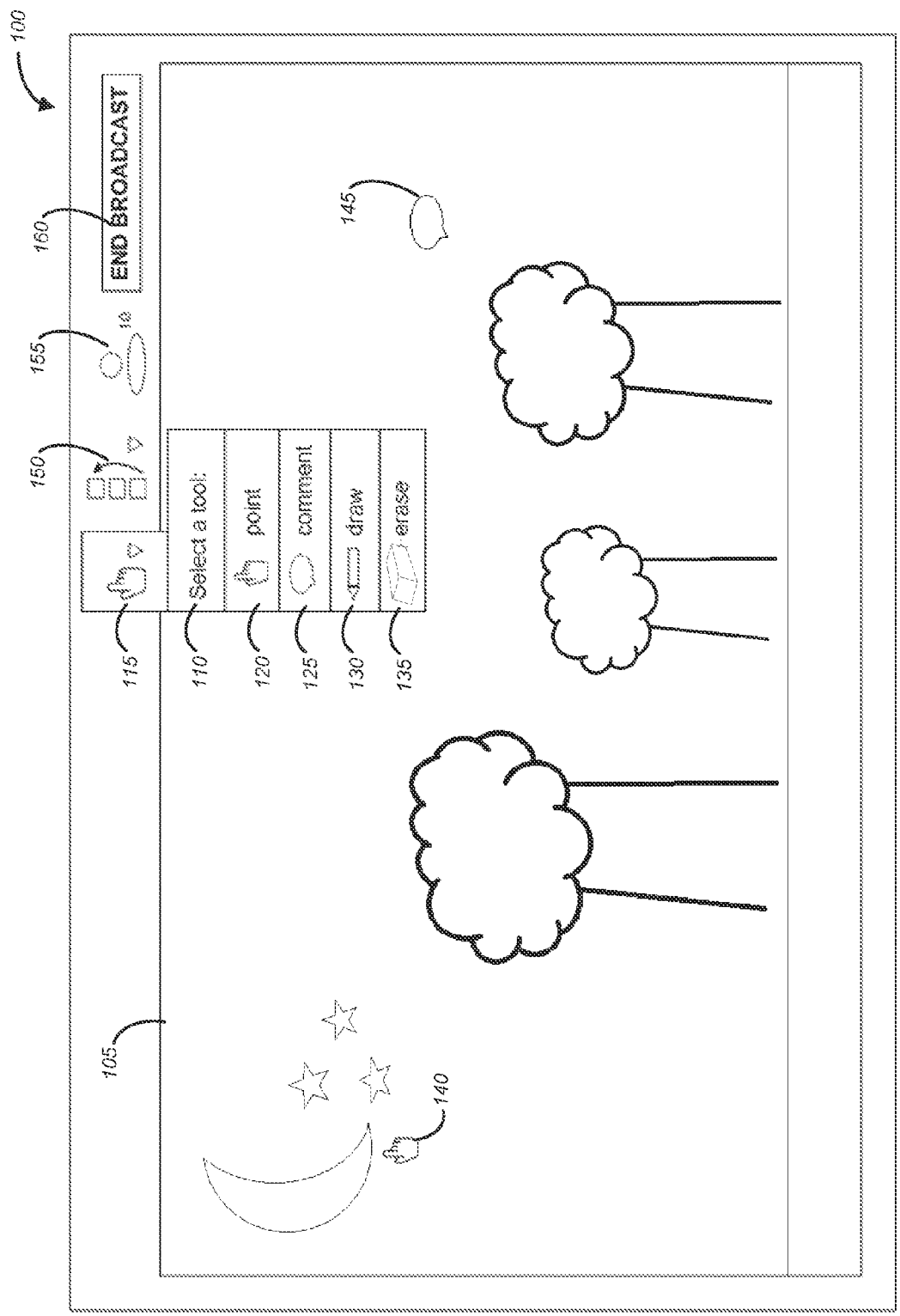
FIG. 1 is an interface diagram illustrating an example user interface displaying contents of a first file on a presenter device, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail on as not to obscure the claimed subject matter.

Some portions of the detailed description which follow are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, a "document" or "an electronic document" refers to electronic media content that is accessible by computer technology. For example, a document can be a file that is not an executable file or a system file and includes data for use by a computer program. An example of a document includes a single or multiple files that are accessible by and/or associated with electronic document processing applications such as word processing applications, document viewers, email applications, presentation applications, spreadsheet applications, diagramming applications, graphic editors, graphic viewers, enterprise applications, web design applications, and other applications. Therefore, as explained in more detail below, a document may be composed of alphanumeric texts, symbols, images, videos, sounds, and other data. It should be appreciated that a document can have a variety of file formats that, for example, may be identified by data within a document and/or by the filename extension. Examples of file formats that may be associated with a document include Adobe Portable Document Format (PDF), Microsoft DOC format, Hypertext Markup Language (HTML) format, Extensible Markup Language (XML) format, Microsoft XLS format, Cascading Style Sheet (CSS) format, Tag Image File Format (TIFF), Rich Text Format (RTF), Report File Format (RPT), and the like.

Methods and systems are described that allow interactive broadcasting of content between devices. The interactive broadcasting between devices allows viewers of a presentation to have the freedom and control to view the presentation at the viewers own pace and the ability to add and communicate content via the presentation to other attendees of a presentation. A presenter may access one or more files that the presenter wishes to broadcast to one or more viewing devices of users who wish to view materials to be presented by a presenter. The presenter device and the viewing devices may be any suitable computing device, such as a laptop, desktop, computing tablet, mobile phone, smart phone, and the like. The content of the files to be presented may be broadcasted by the presenter device to the viewing devices in any manner allowing communication between the devices. For example, the presenter and viewing devices may communicate using a direct connection or over a network, which may be any suitable network. In various embodiments, one or more portions of the network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks. The content of a file broadcast to a viewing device may be in any form or format, such as an image, video, text document, and the like.

When a presenter begins a presentation, the presenter may select a file to broadcast to one or more viewing devices of users who wish to view the presentation. The presenter may open the file selected so that the content of the file is displayed on the presenter device. When a presenter sends the content of a file from the presenter's device to one or more viewing devices, the file, as well as state information associated with the state of the content of the file, are sent to the viewing devices. The state of the content of a file may be associated with the manner in which the content is presented and/or displayed, and the state information associated with the state of the content of the file may include any information or metadata associated with the manner of presentation and/or display. For example, the state information may include information associated with a zoomed-in or zoomed-out view of the content, objects added to the content of the file (e.g., an annotation, a pointer, etc.), and the like. In some embodiments, a viewer of a presentation may have the ability to control whether the viewer wishes to zoom in or out of content being presented, regardless of the manner in which the content is being presented by the presenter. For example, a viewer may zoom into content while the presenter is zoomed out of the content.

The state of content may be changed by the presenter device and the users of the viewing devices, allowing the users to interact with the content and with each other during the presentation. For example, a presenter may add an annotation or a pointer object to the content to enhance the presentation of the content. The addition of an annotation or a pointer object may result in a change to the state of the content, and state information associated with the change may be generated and sent to the viewing devices such that the viewing devices may be able to display the additional content. In some embodiments, each device may maintain global state information that may be shared with all or at least a portion of the participants of a presentation and local state information that may be specific to the device on which the local state information was created. For example, global state information may include any state information associated with the addition of content that a user of a device wishes to share with other participants (public annotations, pointers, etc.), and local state information may include any state information associated with the addition of content that a user of a device does not wish to share (e.g., personal annotations, zooming, etc.).

Similarly, a viewer may modify existing content or add additional content, such as an annotation or a pointer object, to the content of the file currently being displayed on that viewer device. When a viewer adds content to be displayed to the other users viewing the presentation, the viewer device of the viewer may generate a message indicating the change to the state of the content and send the message to the presenter device. The presenter device may then process the message indicating the change to the state of the content and send the corresponding state information to the viewing devices such that the presenter device and the viewing devices may be able to display the content added by the viewer.

The users viewing the presentation on the viewing devices may also have the ability to review content previously presented by the presenter, allowing a user viewing the presentation to have the control to be synchronized with the presentation given by the presenter or be out of synchronization with the presentation given by the presenter. As a viewing device receives content from a presenter device, the viewing device may store the content along with any state information as it is received from the presenter device. As a presentation progresses, the viewer of the presentation may return to content previously presented by accessing the previously-presented content stored on the viewer device. In some embodiments, the viewing device may display the previously-presented content and the currently-presented content simultaneously. In some embodiments, if a user enters a presentation that is already in progress, the user may request any content that has already been presented from the presenter device so that the user can view the previously-presented content that may have been missed as a result of the user entering the presentation that was already in progress.

FIG. 1 is an interface diagram illustrating an example user interface 100 displaying contents 105 of a first file on a presenter device. The example user interface 100 may include tools which the presenter may use to initiate and/or terminate a broadcast of the presentation, interact with the contents 105, and the like. For example, the button 115 may include a dropdown menu 110 of tools that the presenter may use to interact with the content 105. The button 115 may display an icon corresponding to the tool that is currently selected. In the example of FIG. 1, the button 115 displays the pointer tool 120, which may be used to broadcast the user's pointer, such as the pointer 140. The pointer tool 120 may allow a user to broadcast the user's pointer or cursor to the viewing devices being used to view the presentation to help the user point to different objects in the content 105 being displayed as the user describes or explains the content 105 during the presentation. The dropdown menu 110 may also include options to select a comment tool 125, a drawing tool 130, and an eraser tool 135. The comment tool 125 may allow the user to add a comment or annotation to the content 105 at a particular location, such as the annotation 145. The drawing tool 130 may allow the user to draw objects on the content 105. The eraser tool 135 may allow the user to erase any content added by one of the tools in the dropdown menu 110.

Any number of additions (e.g., annotations, pointers, etc.) may be added by any number of users. The content added by the user using any of the tools in the dropdown menu 110 may be additional content that can be added to the original content of the file. For example, the content 105 displayed on the user interface 100 may be content from a file selected by the presenter. The pointer 140 and the annotation 145 may be additional content added by the presenter. When the content 105 of the selected file is broadcast to one or more viewing devices to display the presentation, state information associated with the pointer 140 and the annotation 145 may be sent to the one or more viewing devices as well so that the viewing devices may display the content of the file in the manner in which it is displayed on the presenter device.

The user interface 100 may also include a dropdown menu associated with tools for viewing and transitioning between one or more files that the presenter wishes to present, such as the button 150. When a presenter wishes to transition or switch from displaying the content of a file to the content of another file, the presenter may do so via the button 150. This may allow the presenter to move back and forth between content in the presentation. In some embodiments, the presenter may have the ability to move back and fourth between content by swiping across the screen when the presenter device is a touch screen device.

The user interface 100 may also include button 155, which may show any information associated with the attendees of a presentation, such as the identity of the attendees, the number of attendees or devices, and the like.

The user interface 100 may also include button 160, which may allow a presenter to end a broadcast (or start a broadcast if the presentation has not yet begun).

Figure 2:
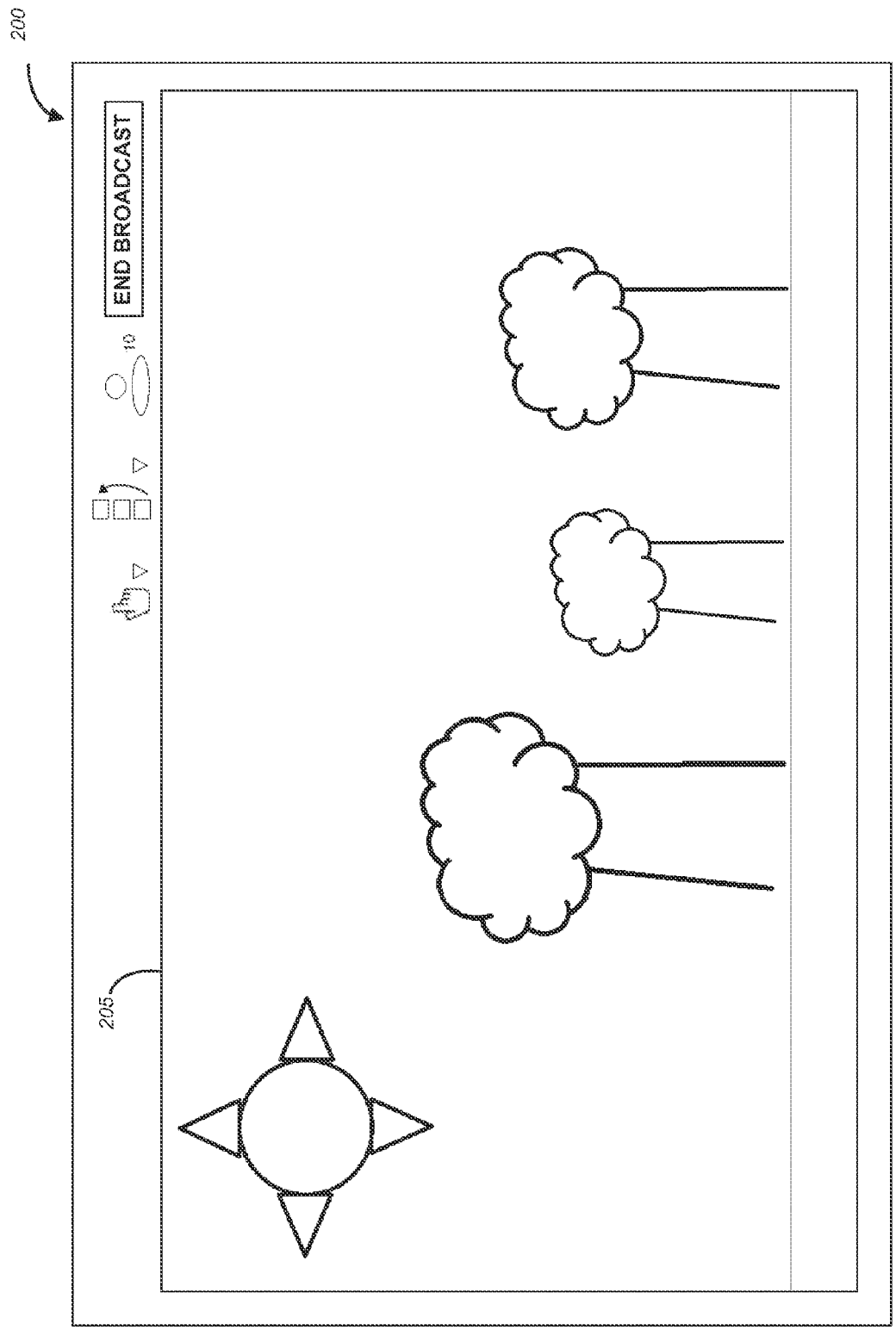
FIG. 2 is an interface diagram illustrating an example user interface displaying contents of a second file on a presenter device, in accordance with an example embodiment.

FIG. 2 is an interface diagram illustrating an example user interface 200 displaying contents of a second file on a presenter device. The user interface 200 may have the same buttons associated with the user tools described in the example of FIG. 1. The contents 205 may be content from a second file within a set of files to be presented. For example, a presentation may have a file having the contents 105 of FIG. 1 and a file having the contents 205 of FIG. 2. The presenter may transition from displaying the contents 105 of first file to displaying the contents 205 of the second file in any manner. As the presenter transitions to new content on the presenter device, the content that is displayed on the presenter device will be sent to the viewing devices viewing the presentation along with any associated state information.

Figure 3:
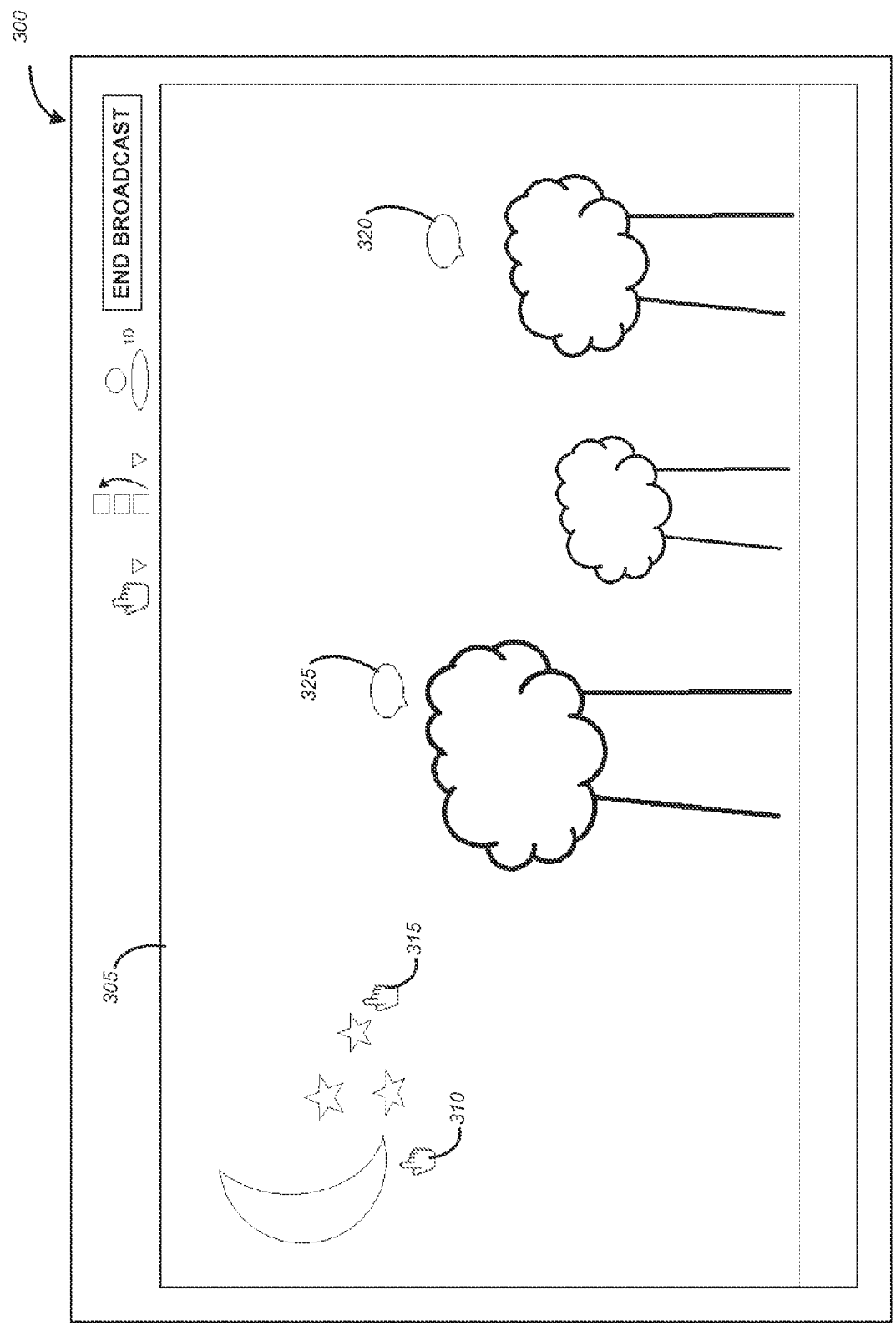
FIG. 3 is an interface diagram illustrating an example user interface displaying contents of the first file on a viewing device, in accordance with an example embodiment.

FIG. 3 is an interface diagram illustrating an example user interface 300 displaying contents 305 of the first file on a viewing device. The example user interface 300 of the viewing device may be similar to the user interface 100 of FIG. 1, which also displays the contents of the first file to be broadcast to one or more viewing devices, such as the viewing device of FIG. 3. The user interface 300 of the viewing device may have similar functionality to the user interface 100 of the presenter device and may include similar tools. For example, the pointer tool of the viewing device may be used to broadcast the viewer's pointer or cursor, such as cursor 315. In addition to the viewer's cursor 315, the presenter's cursor or pointer 310 may also be displayed. The ability to allow users to broadcast their pointers may allow each participant in a meeting to point to objects on the content 305 to supplement an explanation of the object during the meeting.

The content 305 may also include any annotations added by participants of the meeting, such as the annotation 320 added by a presenter and the annotation 325 added by the user of the viewing device.

In some embodiments, the pointers 310 and 315 and the annotations 320 and 325 may be graphically distinct from each other (e.g., different colors or designs) so as to indicate which pointer and/or annotation belongs to which meeting participant. For example, the pointer 310 and annotation 320, which may belong to the presenter, may be green, white the viewer's pointer 315 and annotation 325 may be blue. In some embodiments, the presenter may have the ability to control the content added by viewers of the presentation. For example, the presenter may have the ability to display annotations from viewers of the presentation or from the presenter, or the presenter may have the option to hide any annotations added by the viewer or by the presenter.

Figure 4:
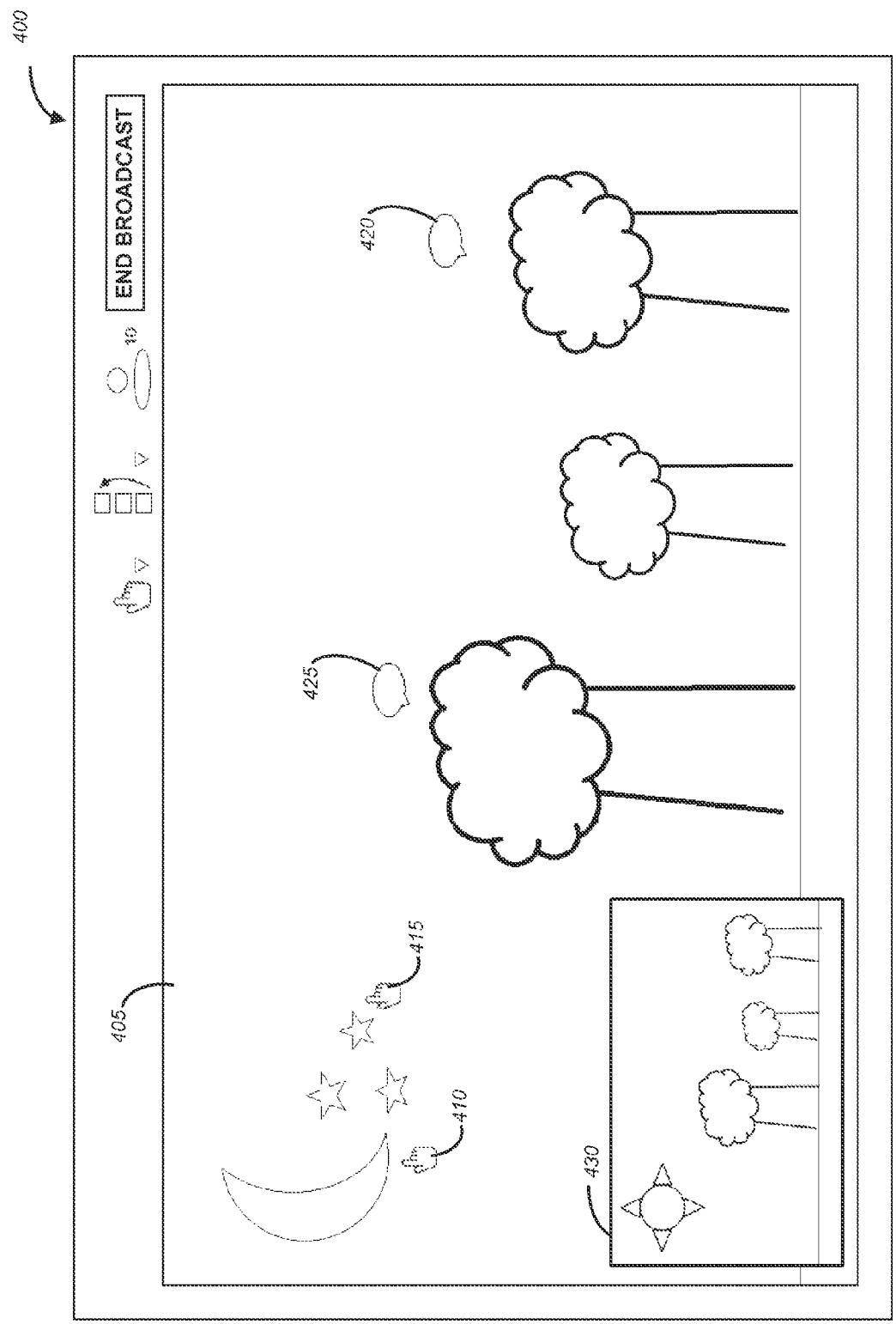
FIG. 4 is an interface diagram illustrating an example user interface displaying contents of the first file and the second file on a viewing device, in accordance with an example embodiment.

FIG. 4 is an interface diagram illustrating an example user interface 400 displaying the contents 405 of the first file and the contents 430 of the second file on a viewing device. The contents 405 of the first file may include any additional content added by the meeting participants, such as the pointers 410 and 415 and the annotations 420 and 425.

If the presenter advances to the next file in the presentation (e.g., the presenter transitions from displaying and broadcasting the content 105 of the first file shown in FIG. 1 to the content 205 of the second file shown in FIG. 2), a viewer of the presentation has the option to return to a previous file if that viewer is not yet ready to move forward in the presentation. In some embodiments, a latecomer to the presentation may review previously presented content by requesting and accessing the content from the presenter device while the presenter device is displaying and broadcasting the contents of another file.

In some embodiments, the currently presented content may be displayed on the viewer device while the previously presented content is also being displayed. For example, the contents 405 of the previously viewed first file may be displayed while the contents 430 of the second file currently being displayed on the presenter device may be viewed in a smaller window on the user interface 400.

Figure 5:
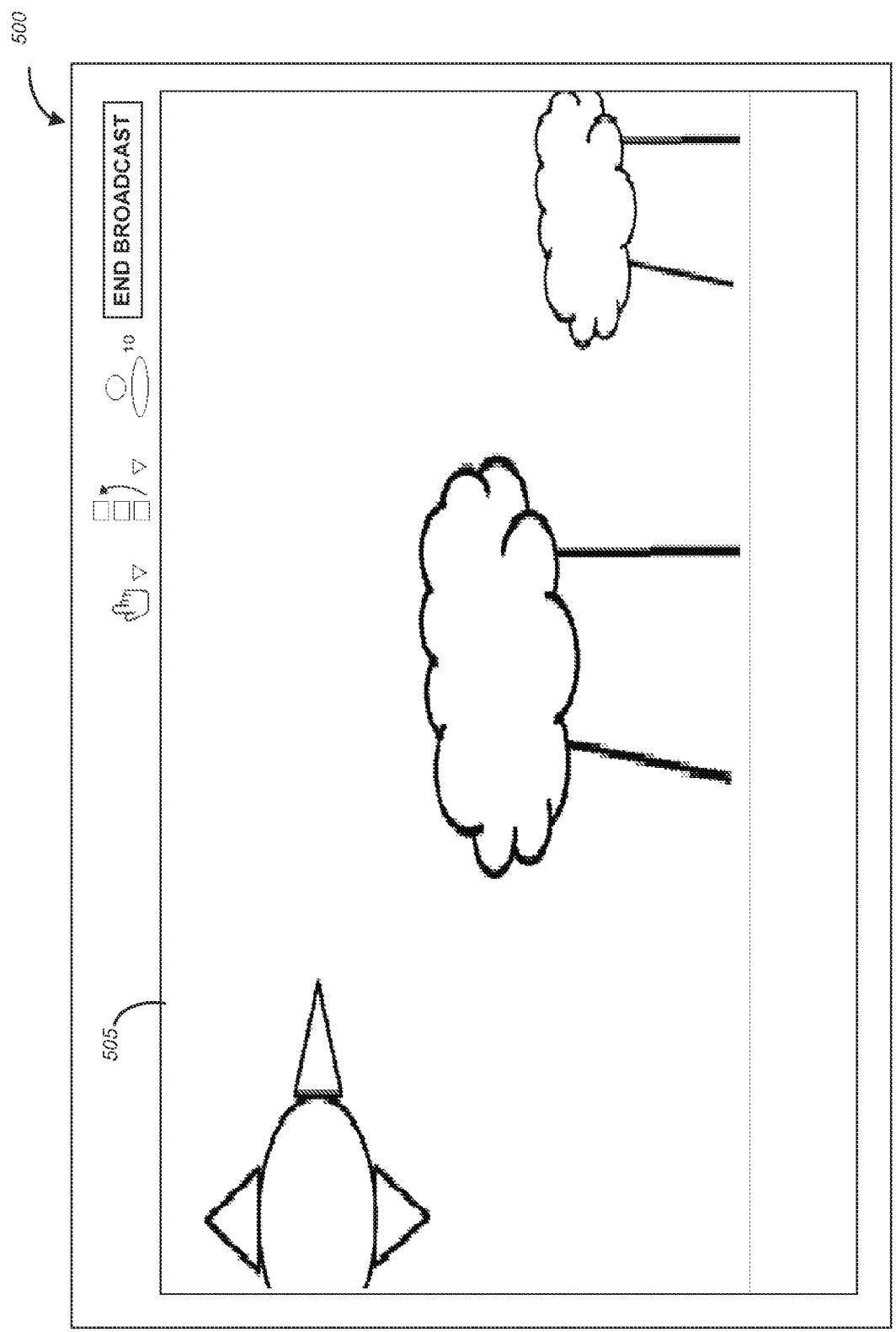
FIG. 5 is an interface diagram illustrating an example user interface displaying a zoomed-in view of contents of the second file, in accordance with an example embodiment.

FIG. 5 is an interface diagram illustrating an example user interface 500 displaying a zoomed-in view of the contents 505 of the second file. As previously described, a user of a presenter device or a viewing device may have the ability to adjust the manner in which content 505 is viewed. For example, the user may zoom in or out on the content 505 and pan to different portions of the content 505. In some embodiments, any such change in the manner of display may result in a change to the state of the content 505, and the state information associated with that change in the state can be sent to other devices displaying the content 505 such that those devices may display the change in the manner of display of the content 505 as well.

Figure 6A:
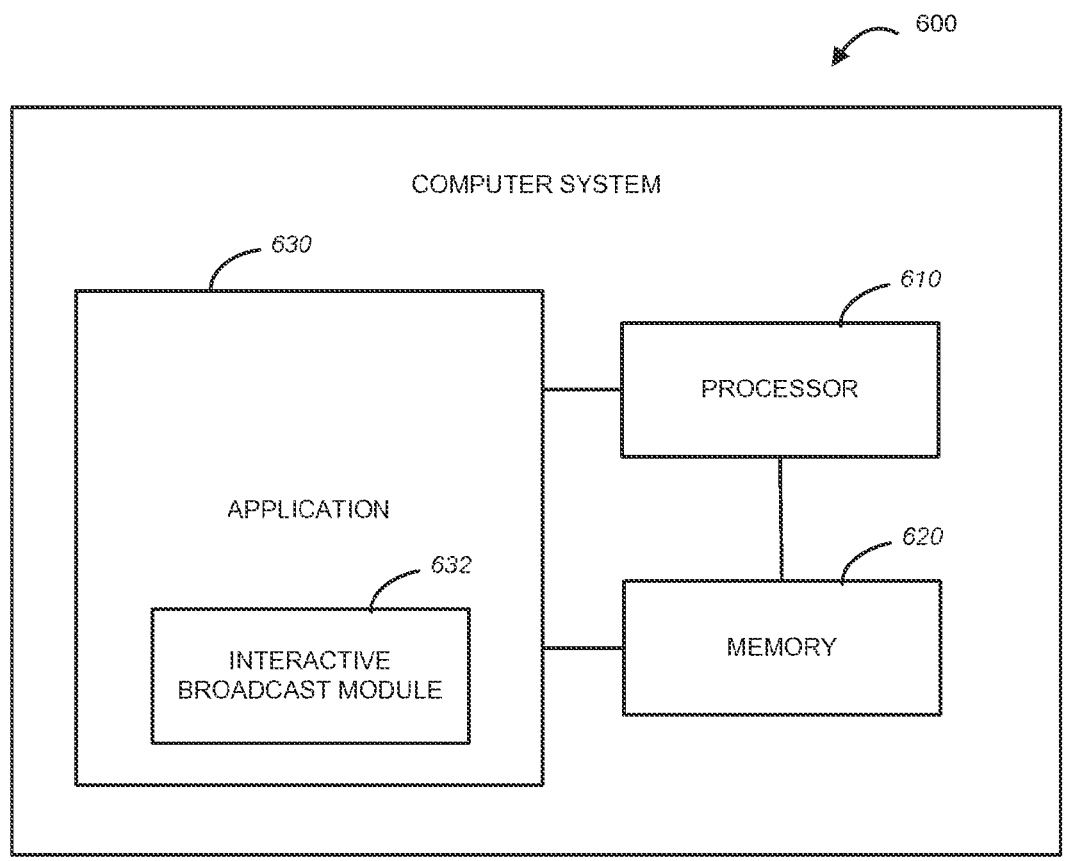
FIG. 6A is a block diagram showing an example system architecture within which an interactive broadcasting system and method is implemented, in accordance with an example embodiment.

FIG. 6A is a block diagram showing an example system architecture within which an interactive broadcasting system and method is implemented. The computer system 600 may be a computer system associated with a presenter device or a viewing device and comprises one or more processors including one or more processors 610 coupled to a memory 620 and an application 630. The application 630 may be any software application providing a user with the ability to receive, broadcast, and/or interact with content and may include an interactive broadcast module 632. The interactive broadcast module 632 may be implemented as a module that is part of the application 630 or as a plug-in that can be utilized with the application 630. The interactive broadcast module 332, in one example embodiment, may be configured to allow a user to broadcast and interact with content, or may be configured to allow a user to receive a broadcast of content and interact with that content.

Figure 6B:
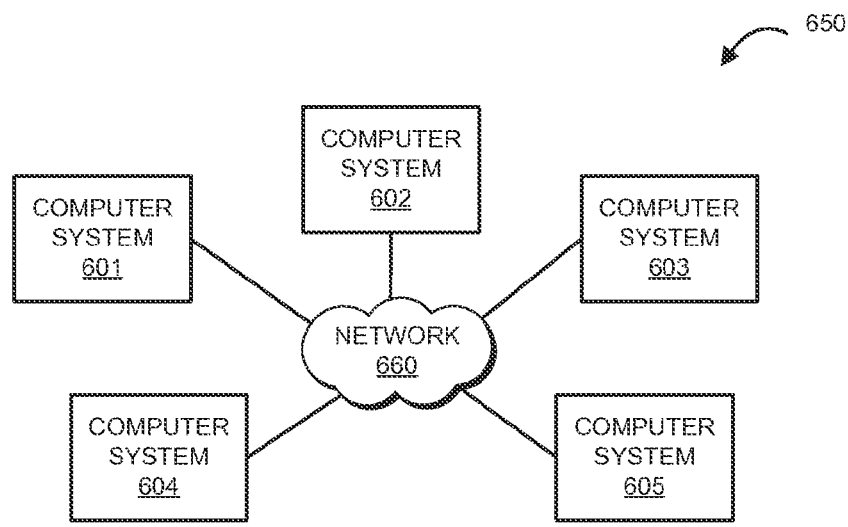
FIG. 6B is a block diagram showing an example of a networked system within which interactive broadcasting is implemented, in accordance with an example embodiment.

FIG. 6B is a block diagram showing an example of a networked system 650 within which interactive broadcasting is implemented. The networked system 650 may include any number of computer systems similar to the computer system 600 of FIG. 6A, and any of the computer systems may function as either presenter devices or viewing devices. In the example of FIG. 6B, the example networked system includes computer systems 601, 602, 603, 604, and 605, all communicatively coupled through the network 660. As previously described, the network 660 may be in any form, such as a LAN, WAN, a portion of the Internet, and the like. The network 660 may be used to communicate any presentation information (e.g., presentation content, state information, etc.).

Figure 7:
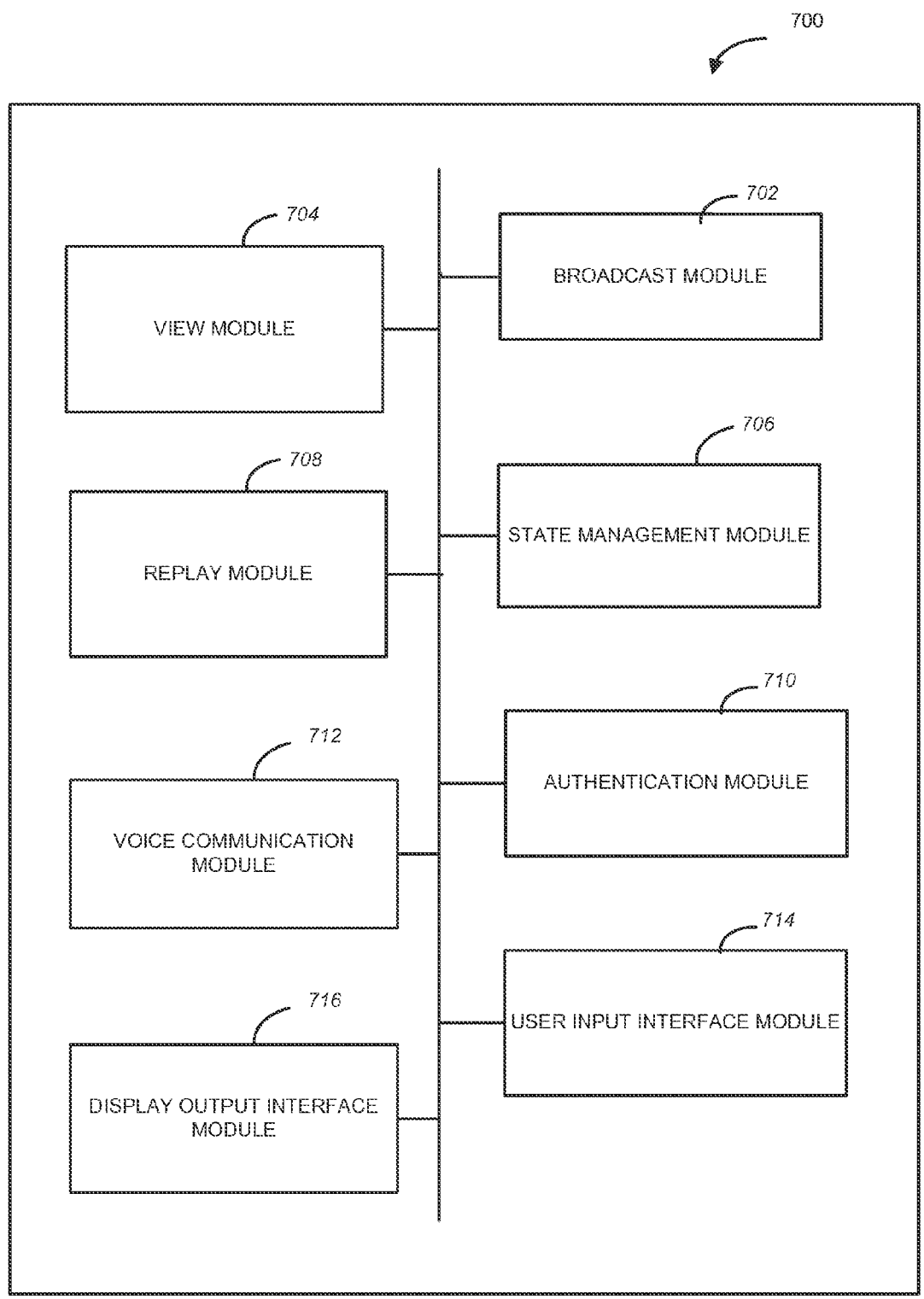
FIG. 7 is a block diagram showing example components of an interactive broadcasting system, in accordance with an example embodiment.

FIG. 7 is a block diagram showing example components of an interactive broadcasting system 700. In one example embodiment, the system 700 for providing interactive broadcasting may be associated with an application and may correspond to the interactive broadcast module 332 of FIG. 6. Each of the modules of the system 700 may be implemented utilizing at least one processor.

As shown in FIG. 7, the system 700 includes a broadcast module 702, a view module 704, a state management module 706, a replay module 708, an authentication module 710, a voice communication module 712, a user input interface module 714, and a display output interface module 716.

The broadcast module 702 may be a hardware-implemented module which may manage and control the broadcasting of content and state information to one or more viewing devices. For example, when a broadcast of a file is initiated by a presenter device, the broadcast module 702 of the presenter device may manage and control the transmission of the file and any state information associated with the content of the file to one or more viewing devices that are to receive the broadcast.

The view module 704 may be a hardware-implemented module which may manage and control the manner in which content is displayed. The view module 704 may generate any display data for displaying content in any manner. For example, the view module 704 may generate display data for displaying added content (e.g., pointers, annotations, etc.), zooming, panning, and the like.

The state management module 706 may be a hardware-implemented module which may generate, manage, and control any state information associated with the state of content. This may include the management of state information associated with pointers, annotation, zooming, panning, and the like. In some embodiments, the state information may be managed using an XML document.

The replay module 708 may be a hardware-implemented module which may manage and control the storing and accessing of files associated with content being presented as well as any state information associated with the content. As a presenter device presents content to one or more viewing devices, the replay module 708 may store the content as it is being presented so that a history of the content may be saved for future use. Additionally, as a viewing device receives content and state information associated with that content from a presenter device, the replay module 708 may store the content and state information. If a user of the viewing device requests access to previously presented content, the replay module 708 may access the stored content and state information in response to the request so that the previously presented content may be displayed on the viewing device. The replay module 708 may also manage and control the simultaneous display of the currently presented content as well as the requested previously presented content.

The authentication module 710 may be a hardware-implemented module which may manage and control authentication of a device. In some embodiments, if a presentation is being sent from a presenter device to a viewing device over a network, the authentication module 710 may first authenticate the viewing device to ensure that the viewing device is authorized to receive the presentation. The authentication module 710 may perform any type of authentication. For example, the authentication of a viewing device may include receiving from the viewing device an identifier associated with the broadcast of content and a token associated with the viewing device, which may be validated by the presenter device before allowing the viewing device to receive any content.

The voice communication module 712 may be a hardware-implemented module which may manage and control the transmission and receipt of audio from participants of the meeting (e.g., viewers of a presentation, a presenter, etc.). The voice communication module 712 may send and receive audio in any manner, such as over a network, over the telephone, and the like.

The user input interface module 714 may be a hardware-implemented module which may receive user inputs relating to the broadcast of and interaction with content. For example, the user input interface module 714 may receive a user input relating to a request to receive previously presented content, a request to add an annotation, and the like. The user input received by the user input interface module 714 may be in any form, such as a keyboard input, a pointing device input, input from a touch screen, and the like.

The display output interface module 716 may be a hardware-implemented module which may generate, manage, and control display data to display content on a display of the device. For example, the display output interface module 716 may generate display data to display the content of a file, any additional content added by a user, and the like.

Figure 8:
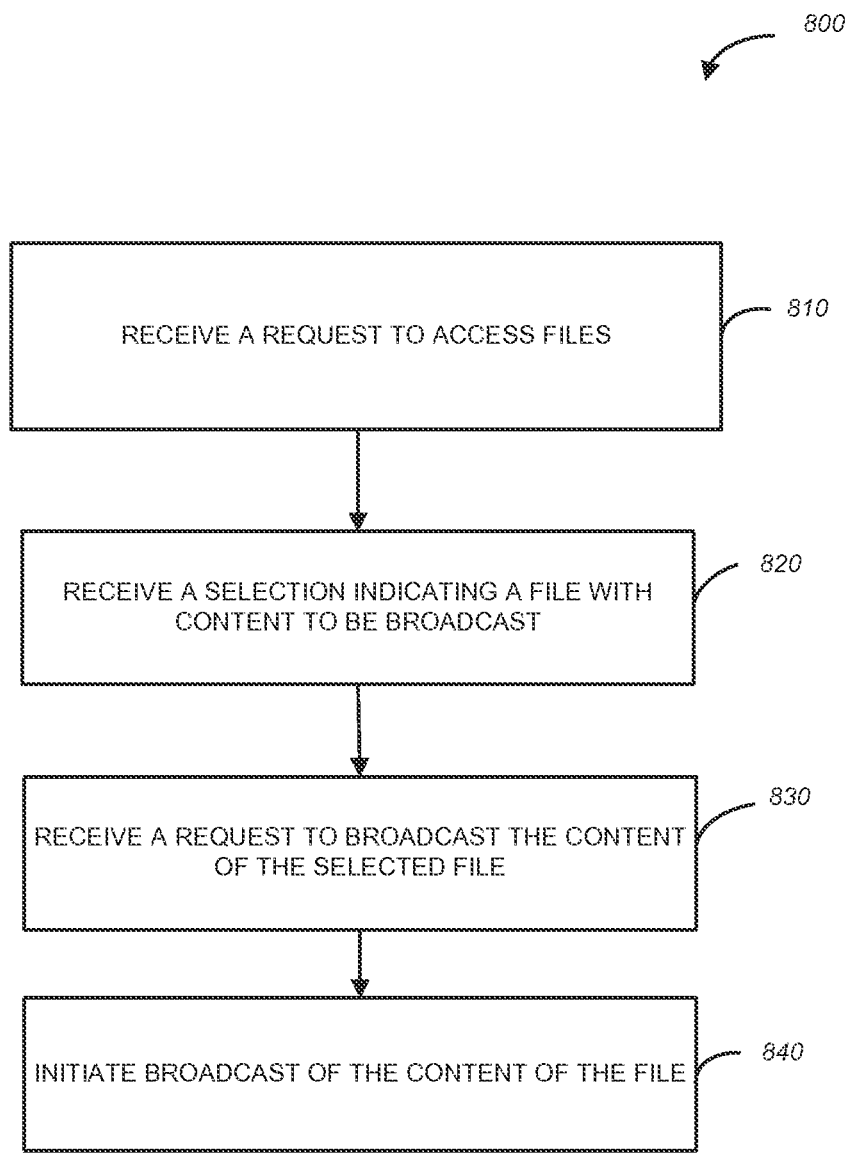
FIG. 8 is a flowchart showing an example method of initiating a broadcast of content from a presenter device to one or more viewing devices, in accordance with an example embodiment.

FIG. 8 is a flowchart showing an example method 800 of initiating a broadcast of content from a presenter device to one or more viewing devices. The method 800 may be performed with or without authenticating the one or more viewing devices that may receive the content.

In operation 810, the user input interface module 714 of the presenter device may receive a request to access files from the presenter. The presenter may request access to files stored on the presenter device that the presenter may present to viewers of the presentation. In some embodiments, the presenter may access a particular file directory in which the presenter has saved the files that may be used in the presentation.

In operation 820, the user input interface module 714 of the presenter device may receive a selection indicating a file with content to be broadcast to the one or more viewing devices. In some embodiments, the file selected by the presenter may be a file within the file directory for which the presenter requested access.

In operation 830, the user input interface module 714 of the presenter device may receive a request to broadcast the content of the selected file. In some embodiments, the request may be received in any manner. For example, the request may be received using a broadcast button on the user interface displayed on the presenter device, by clicking on the selected file, and the like.

In operation 840, the broadcast module 702 of the presenter device may initiate the broadcast of the content of the selected file in response to the request, which may include ensuring the content is in a proper format for the presentation, and the like. In some embodiments, initiating the broadcast may include authenticating a viewing device before sending any content to the viewing device.

Figure 9:
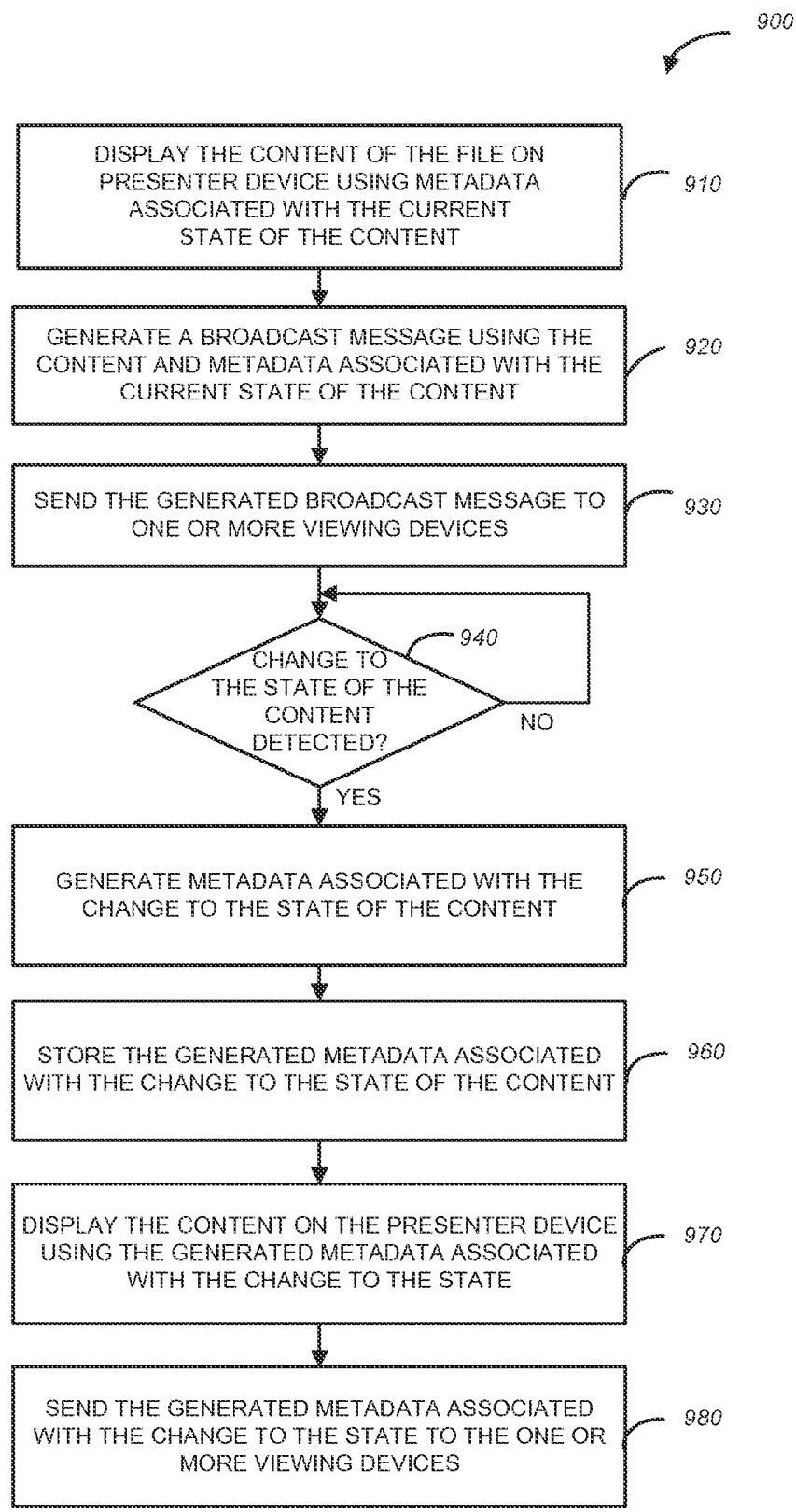
FIG. 9 is a flowchart showing an example method of broadcasting content from a presenter device to one or more viewing devices, in accordance with an example embodiment.

FIG. 9 is a flowchart showing an example method 900 of broadcasting content from a presenter device to one or more viewing devices. The content that is broadcast may include any of the files accessed for the presentation, as described in the explanation of FIG. 8.

In operation 910, the display output interface module 716 of the presenter device may generate display data to display the content of the file on the presenter device. The content may be displayed using any metadata associated with the current state of the content. The metadata associated with the state of the content may be any state information associated with the manner in which the content is displayed in the current state, including metadata associated with any annotations, pointers, and the like, that may be displayed with the content of the file. When the content of the file is displayed in a particular state, the content and its state are stored by the replay module 708 of the presentation device for future use.

In operation 920, the broadcast module 702 of the presenter device may generate a broadcast message using the content and the metadata associated with the current state of the content. The broadcast message may be in any format and may be a message containing any information associated with the currently presented content, including the file for the content, metadata for the state information, and the like.

In operation 930, the broadcast module 702 may send the generated broadcast message to one or more viewing devices of meeting attendees viewing the presentation. The broadcast message may be used by the viewing devices to display the content in its current state and may be stored by the replay module 708 of the viewing devices so that the content in that particular state may be accessed at a later time.

In operation 940, the state management module 706 may determine whether a change to the state of the content has been detected. A change to the state of the content may be detected if any of the users initiate a change to the manner in which the content is displayed. For example, a presenter or a viewer may add content to the content of the file (e.g., a pointer, an annotation, etc.), zoom into or out of the content, and the like. If a change to the state of the content is not detected, the presenter device may continue to display the content in its current state and continue to check periodically or wait for any changes to the state of the content.

If a change to the state of the content is detected, in operation 950, the state management module 706 may generate metadata associated with the change to the state of the content. The generated metadata may include any state information corresponding to the change to the state that was detected. For example, if a presenter or viewer added an annotation to the content of the file, the state management module 706 may generate metadata associated with the added annotation.

In operation 960, the replay module 708 of the presenter device may store the generated metadata associated with the change to the state of the content so that the history of the presentation may be maintained for any future use.

In operation 970, the display output interface module 716 of the presenter device may display the content on the presenter device using the generated metadata associated with the change to the state of the content so that the detected change can be displayed. For example, if a presenter or viewer added an annotation to the content of the file, the display output interface module 716 may use the generated metadata associated with the change to the state of the content to generate display data to display the added annotation.

In operation 980, the broadcast module 702 of the presenter device may send the generated metadata associated with the change to the state of the content to the one or more viewing devices so that the one or more viewing devices may display the change to the state of the content.

Figure 10:
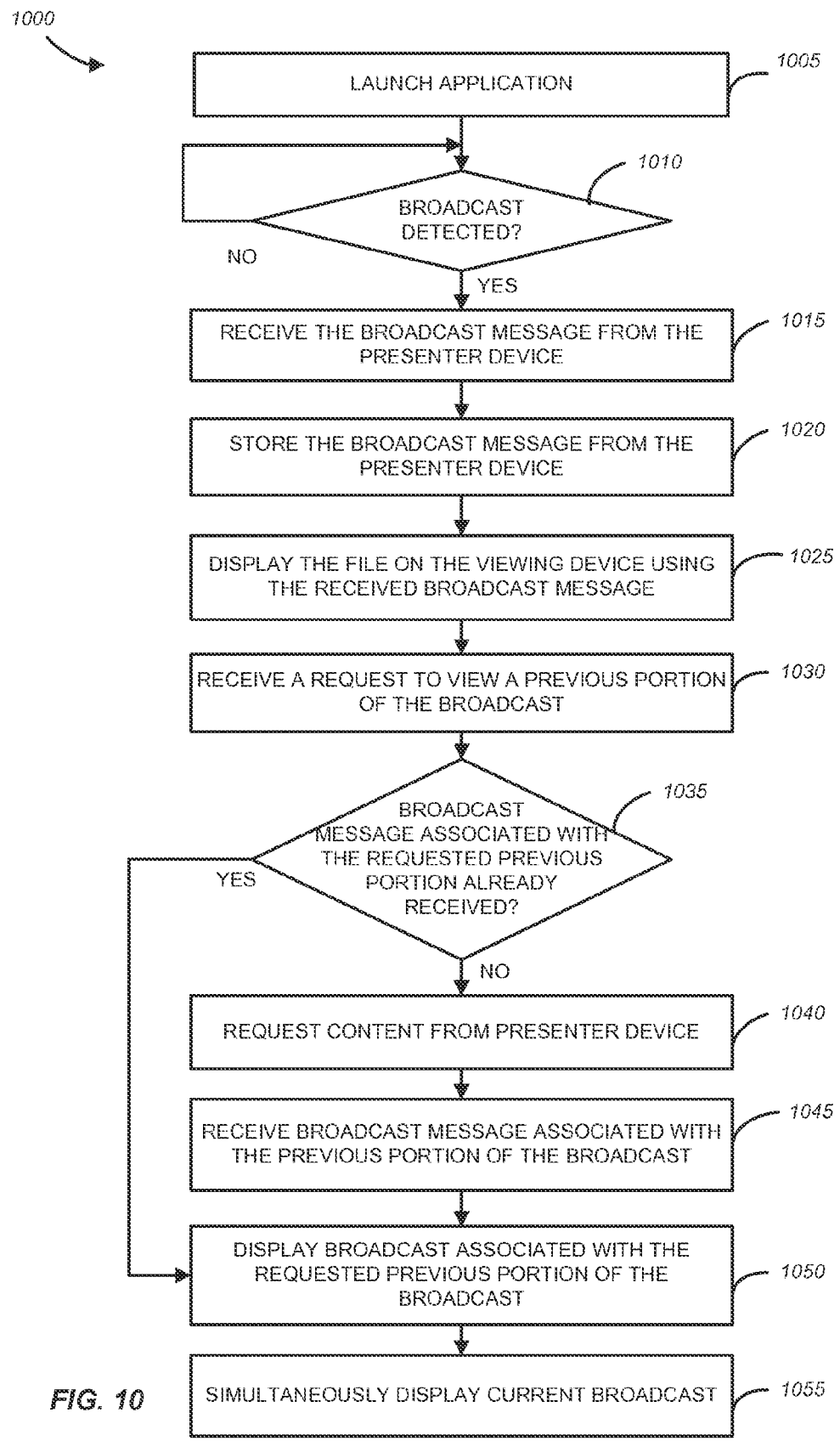
FIG. 10 is a flowchart showing an example method of displaying content broadcast from a presenter device, in accordance with an example embodiment.

FIG. 10 is a flowchart showing an example method 1000 of displaying content broadcast from a presenter device to a viewing device. In operation 1005, an application associated with viewing an interactive presentation may be launched in response from a request from the user of the viewing device. An example of the application may be the application 630 described in FIG. 6.

Once the application is launched, in operation 1010, the broadcast module 702 of the viewing device may determine whether a broadcast is detected. This may include determining whether a broadcast message is being sent to one or more viewing devices. In some embodiments, this may include determining whether a particular broadcast is detected by searching for a broadcast relating to a particular broadcast identifier. In some embodiments, the viewing device may determine whether any broadcasts are detected, and the user may select a broadcast to join from a list of available broadcasts. If a broadcast is not detected, the broadcast module 702 may continue to wait and check for a broadcast.

If a broadcast is detected, in operation 1015, the broadcast module 702 of the viewing device may receive the broadcast message associated with the broadcast from the presenter device. As previously described, the broadcast message may include any information associated with the content currently being displayed by the presenter device, including the file for the content, any metadata associated with the state of the content, and the like.

In operation 1020, the replay module 708 of the viewing device may store the broadcast message and its contents received from the presenter device so that a history of the broadcasted presentation may be maintained for any future use.

In operation 1025, the display output interface module 716 of the viewing device may generate display data to display the content of the file on the viewing device using the received broadcast message. The user of the viewing device may then view the content and may interact with the content (e.g., zoom, pan, add a pointer, add an annotation, etc.). More detail on the user's ability to interact with the content will be described in the explanation of FIG. 11.

In some embodiments, the user of the viewing device may wish to view content previously presented during the presentation. For example, in operation 1030, the user input interface module 714 of the viewing device may receive a request to view a previous portion of the broadcast. The request may be received in any manner (e.g., using the button 150 of FIG. 1).

In operation 1035, in response to the request of operation 1030, the replay module 708 may determine whether the broadcast message associated with the requested previous portion has already been received. The replay module 708 may access the history of the broadcast stored on the viewing device to determine whether the content requested was already previously received.

If the replay module 708 determines that the requested content has already been received, the replay module 708 may access the requested content, and in operation, 1050, the replay module 708 may display the broadcast associated with the requested previous portion of the broadcast.

If the replay module 708 determines that the requested content has not yet been received, in operation 1040, the replay module 708 may generate and send a request for the content to the presenter device.

When the presenter device receives the request from the viewing device, the replay module 708 of the presenter device may access the history of the presentation and may send to the viewing device any content that the viewing device requests in the form of a broadcast message. In some embodiments, the presenter device may send any content that the viewing device has not yet received.

In operation 1045, the replay module 708 may receive the broadcast message associated with the previous portion of the broadcast and store the received message. In operation 1050, the broadcast associated with the requested previous portion of the broadcast may then be displayed via the display output interface module 716 of the viewing device.

While a user is viewing a previous portion of a broadcast, the broadcast module 702 of the viewing device may still continue to receive any content currently being presented. In operation 1055, the current broadcast may be displayed simultaneously with the previously presented portion of the broadcast. The current and prior content may be display simultaneously in any manner. An example of a simultaneous broadcast may be the picture-in-picture example shown in FIG. 4.

Figure 11:
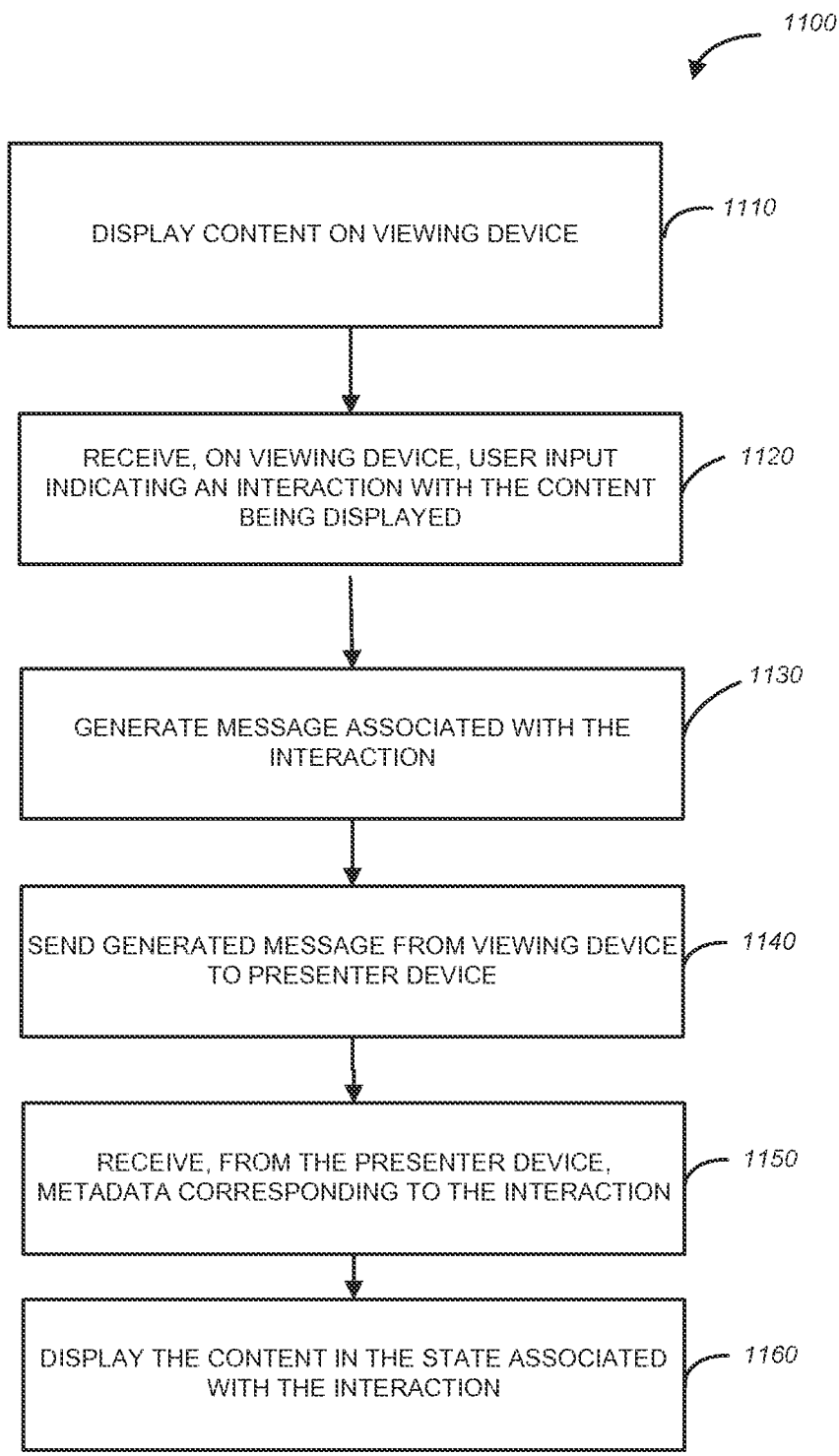
FIG. 11 is a flowchart showing an example method of interacting with content broadcast from a presenter device, in accordance with an example embodiment.

FIG. 11 is a flowchart showing an example method 1100 of interacting with content broadcast from a presenter device. At any point during a presentation, a user of a viewing device may have the ability to interact with content received from a presenter device. For example, in operation 1110, the display output interface module 716 of a viewing device may display content that was received from the presenter device.

In operation 1120, the user input interface module 714 of the viewing device may receive a user input indicating an interaction with the content being displayed. As previously described, the interaction may include any interaction which changes the manner in which the content is displayed (e.g., adding content, zooming, panning, etc.).

In operation 1130, the state management module 706 may generate a message associated with the interaction, which may include information relating to the changed state of the content. For example, the message may include information associated with any content added, zooming, panning, and the like.

In operation 1140, the generated message may be sent from the viewing device to the presenter device. The presenter device may then use this information to generate metadata corresponding to the change to the state of the content (e.g., operation 950 of FIG. 9), and the presenter device may send the generated metadata to one or more viewing devices displaying the presentation (e.g., operation 960 of FIG. 9) so that the one or more viewing devices may display the interaction provided by the user in operation 1120.

In operation 1150, the broadcast module 702 of the viewing device may receive the generated metadata corresponding to the interaction from the presenter device.

In operation 1160, the received metadata may be used by the display output interface module 716 to generate display data to display the content in the state associated with the interaction.

Figure 12:
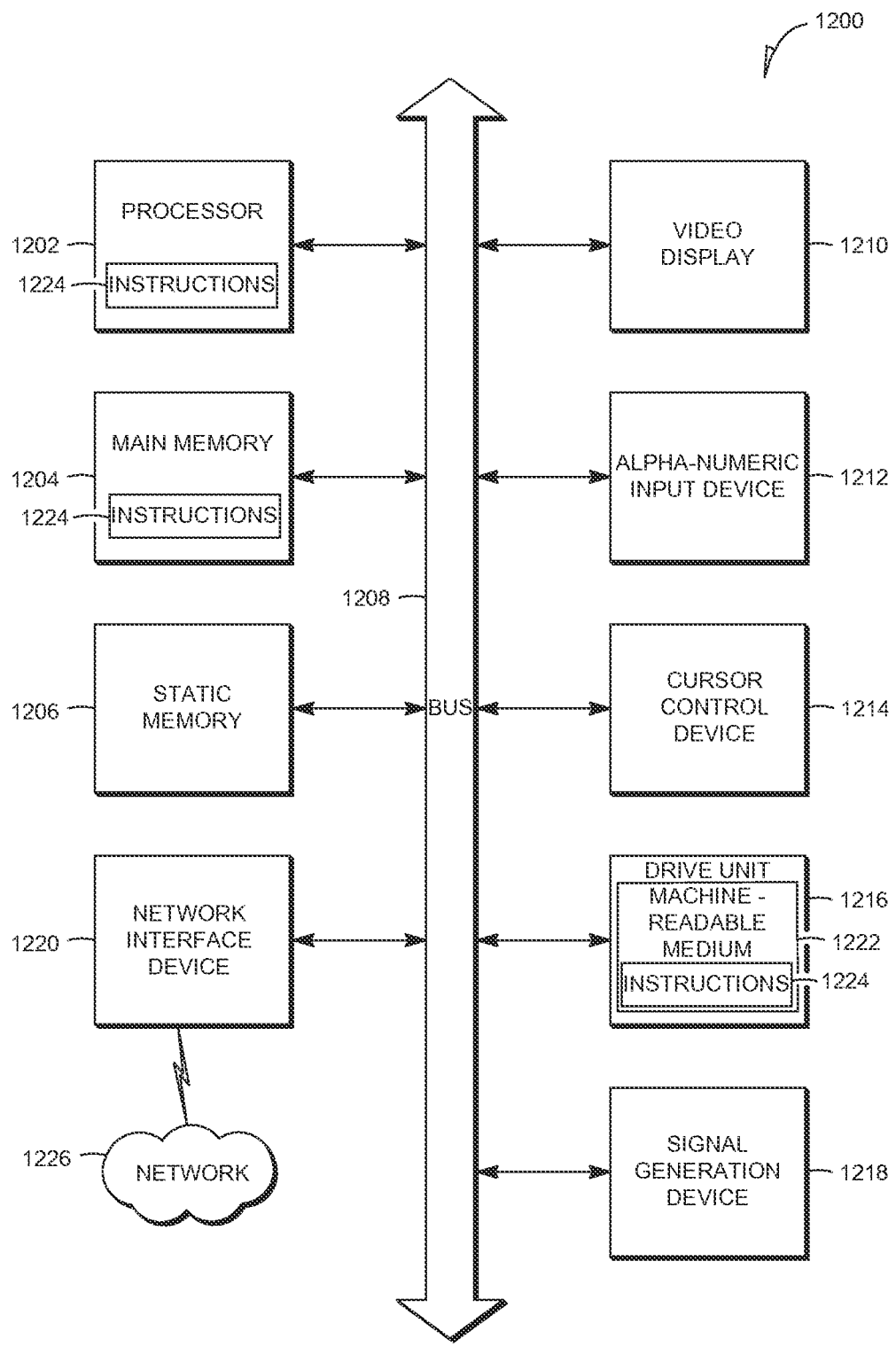
FIG. 12 is a diagrammatic representation of a machine in the example form of a computer system within which a set of instructions may be executed to cause the machine to perform any one or more of the methodologies illustrated in accordance with FIGS. 1-11 related to interactive broadcasting between devices.

FIG. 12 is a diagrammatic representation of a machine in the example form of a computer system 1200 within which may be executed a set of instructions for causing the machine to perform any one or more of the methodologies related to interactive broadcasting between devices. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a user interface (UI) navigation device 1214 (e.g., a cursor control device), a disk drive unit 1216, a signal generation device 1218 (e.g., a speaker) and a network interface device 1220.

The disk drive unit 1216 includes a non-transitory machine-readable storage medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media.

The instructions 1224 may further be transmitted or received over a network 1226 via the network interface device 1220 utilizing any one of a number of well-known transfer protocols (e.g., Hyper Text Transfer Protocol (HTTP)).

While the non-transitory machine-readable storage medium 1222 is shown in an example embodiment to be a single medium, the term "machine-readable storage medium" should be taken to include a single medium or multiple media (e.g., a centralized or distributed database, and/or associated caches and servers) that store the one or more sets of instructions 1224. The term "machine-readable storage medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable storage medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, methods and systems for providing interactive broadcasting between devices have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A computer-implemented method comprising:
sending, from a presenter device to one or more viewing devices, first content of a first file and first state information associated with a first state of the first content being displayed on the presenter device, wherein the presenter device and the one or more viewing devices comprise global state information and local state information, the global state information includes state information, including the first state information, to be shared and the local state information not to be shared,
wherein the first content of the first file is stored on the one or more viewing devices for the one or more viewing devices to access, based at least in part on the global state information corresponding to the one or more viewing devices, the first content, and control the display of the first content independently of content displayed by the presenter device, based at least in part on the local state corresponding to the one or more viewing device;
receiving, at the presenter device, a notification indicating additional content to add to the first content in the first state including receiving the notification from a first viewing device of the one or more viewing devices, the additional content of the notification corresponding with the global state information that is updated with the additional content at the first viewing device independently of the local state information of the first viewing device;
generating, at the presenter device, second state information associated with a second state of the first content and the global state information of the presenter device, using the notification, the second state and the global state information of the presenter device relating to the additional content added to the first content in the first state;
sending the second state information from the presenter device to the one or more viewing devices to display the first content in the second state on the one or more viewing devices; and
displaying the first content in the second state on the presenter device.

2. The method of claim 1, wherein the additional content includes a first pointer object added by a first user of the first viewing device, the first pointer object is a cursor that is controllable from the first viewing device to indicate a first location within the first content.

3. The method of claim 2, further comprising:
receiving, at the presenter device, a second notification indicating second additional content to add to the first content in the second state including receiving the second notification from a second viewing device of the one or more viewing devices, wherein the second additional content includes a second pointer object added by a second user of the second viewing device, the second pointer object is a cursor that is controllable from the second viewing device to indicate a second location within the first content;
generating, at the presenter device, third state information associated with a third state of the first content using the second notification, the third state relating to the second additional content added to the first content in the second state;
sending the third state information from the presenter device to the one or more viewing devices to display the first content in the third state on the one or more viewing devices; and
displaying the first content in the third state on the presenter device, including displaying the first pointer object and the second pointer object.

4. The method of claim 3, wherein the first pointer object of the first user is graphically distinct from the second pointer object of the second user.

5. The method of claim 1, wherein the additional content includes an annotation object added by a user of the first viewing device, the annotation object including text added by the user.

6. The method of claim 1, further comprising:
receiving, at the presenter device, a user input indicating second additional content to add to the first content in the second state;
generating, at the presenter device, third state information associated with a third state of the first content using the user input, the third state relating to the second additional content added to the first content in the second state;
sending the third state information from the presenter device to the one or more viewing devices to display the first content in the third state on the one or more viewing devices; and
displaying the first content in the third state on the presenter device.

7. The method of claim 1, further comprising:
receiving, at the presenter device, a user input indicating a request to zoom into the first content in the second state being displayed on the presenter device;
generating, at the presenter device, third state information associated with a third state of the first content using the user input, the third state relating to a zoomed-in view of the first content in the second state;
sending the third state information from the presenter device to the one or more viewing devices to display the zoomed-in view of the first content in the second state; and
displaying the zoomed-in view of the first content in the second state on the presenter device.

8. The method of claim 1, further comprising:
receiving a request to transition from displaying the first content of the first file to displaying second content of a second file;
sending, from the presenter device to the one or more viewing devices, the second content of the second file to display the second content on the one or more viewing devices; and
displaying the second content on the presenter device.

9. The method of claim 8, wherein the one or more viewing devices stores the first content of the first file and wherein the one or more viewing devices accesses and displays the first content while the second content is being displayed by the presenter device in response to a request to display the first content while the second content is being displayed on the presenter device.

10. The method of claim 9, wherein the one or more viewing devices displays the first content and the second content simultaneously.

11. A computer-implemented system, comprising:
a presenter device, wherein the presenter device comprises:
a hardware-implemented broadcast module configured to send, to one or more viewing devices, first content of a first file and first state information associated with a first state of the first content being displayed on the presenter device, wherein the presenter device comprises global state information and local state information, the global state information includes state information, including the first state information, to be shared and the local state information not to be shared;
a hardware-implemented state management module configured to receive a notification indicating additional content to add to the first content in the first state including receiving the notification from a first viewing device of the one or more viewing devices, the additional content of the notification corresponding with the global state information that is updated with the additional content at the first viewing device independently of the local state information of the first viewing device;
and the hardware-implemented state module is further configured to generate second state information associated with a second state of the first content using the notification, the second state relating to the additional content added to the first content in the first state, wherein the hardware-implemented broadcast module is further configured to send the second state information from the presenter device to the one or more viewing devices; and
a hardware-implemented presenter device display module configured to display the first content in the second state on the presenter device.

12. The computer-implemented system of claim 11 wherein the presenter device further comprises:
a presenter device user input module configured to receive a request to transition from displaying the first content of the first file to displaying second content of a second file,
wherein the hardware-implemented broadcast module is further configured to send the second content of the second file to the one or more viewing devices to display the second content on the one or more viewing devices, and
wherein the hardware-implemented presenter device display module is further configured to display the second content.

13. The computer-implemented system of claim 12, further comprising:
the one or more viewing devices communicatively coupled to the presenter device, wherein the one or more viewing devices comprises:
a hardware-implemented replay module configured to store the first content of the first file;
a hardware-implemented viewing device user input module configured to receive a request to display the first content while the second content is being displayed on the presenter device, wherein the hardware-implemented replay module is further configured to access the first content in response to the request; and
a hardware-implemented viewing device display module configured to display the first content while the second content is being displayed on the presenter device.

14. The computer-implemented system of claim 13, wherein the hardware-implemented viewing device display module is further configured to display, on the viewing device, the second content being displayed on the presenter device while displaying the first content, in response to the request to display the first content while the second content is being displayed on the presenter device.

15. The computer-implemented system of claim 13, the one or more viewing devices further comprising:
a hardware-implemented view module configured to generate display data to display a zoomed-in view of content being displayed on the one or more viewing devices in response to a zoom user input received at the viewing device user input module, the zoom user input indicating a request to zoom into the content being displayed by the one or more viewing devices, wherein the hardware-implemented viewing device display module is further configured to display the zoomed-in view of the content.

16. The computer-implemented system of claim 11, wherein the additional content includes a pointer object added by a user of the first viewing device, the pointer object indicating a particular location within the first content.

17. The computer-implemented system of claim 11, wherein the additional content includes an annotation object added by a user of the first viewing device, the annotation object including text added by the user.

18. A non-transitory machine-readable storage medium having instructions which, when executed by one or more processors, cause the one or more processors to perform operations, comprising:
sending, from a presenter device to one or more viewing devices, first content of a first file and first state information associated with a first state of the first content being displayed on the presenter device, wherein the presenter device and the one or more viewing devices comprise corresponding global state information and local state information, the global state information includes state information, including the first state information, to be shared and the local state information not to be shared,
wherein the first content of the first file is stored on the one or more viewing devices for the one or more viewing devices to access, based at least in part on the global state information corresponding to the one or more viewing devices, the first content and control the display of the first content independently of content displayed by the presenter device, based at least in part on the local state corresponding to the one or more viewing device;
receiving, at the presenter device, a notification indicating additional content to add to the first content in the first state including receiving the notification from a first viewing device of the one or more viewing devices, the additional content of the notification corresponding with the global state information that is updated with the additional content at the first viewing device independently of the local state information of the first viewing device;
generating, at the presenter device, second state information associated with a second state of the first content and the global state information of the presenter device, using the notification, the second state and global state information of the presenter device relating to the additional content added to the first content in the first state;
sending the second state information from the presenter device to the one or more viewing devices to display the first content in the second state on the one or more viewing devices; and displaying the first content in the second state on the presenter device.

19. The non-transitory machine-readable storage medium of claim 18, wherein the instructions further cause the one or more processors to perform additional operations comprising:
receiving, at the presenter device, a user input indicating second additional content to add to the first content in the second state;
generating, at the presenter device, third state information associated with a third state of the first content using the user input, the third state relating to the second additional content added to the first content in the second state;
sending the third state information from the presenter device to the one or more viewing devices to display the first content in the third state on the one or more viewing devices; and
displaying the first content in the third state on the presenter device.

20. The non-transitory machine-readable storage medium of claim 18, wherein the instructions further cause the one or more processors to perform additional operations comprising:
receiving, at the presenter device, a user input indicating a request to zoom into the first content in the second state being displayed on the presenter device;
generating, at the presenter device, third state information associated with a third state of the first content using the user input, the third state relating to a zoomed-in view of the first content in the second state;
sending the third state information from the presenter device to the one or more viewing devices to display the zoomed-in view of the first content in the second state; and
displaying the zoomed-in view of the first content in the second state on the presenter device.

21. The non-transitory machine-readable storage medium of claim 18, wherein the instructions further cause the one or more processors to perform additional operations comprising:
receiving a request to transition from displaying the first content of the first file to displaying second content of a second file;
sending, from the presenter device to the one or more viewing devices, the second content of the second file to display the second content on the one or more viewing devices; and
displaying the second content on the presenter device.

22. The non-transitory machine-readable storage medium of claim 18, wherein the one or more viewing devices stores the first content of the first file and wherein the one or more viewing devices accesses and displays the first content while the second content is being displayed by the presenter device in response to a request to display the first content while the second content is being displayed on the presenter device.

* * * * *